C. O. BASTIAN.
ELECTRICAL RESISTANCE.
APPLICATION FILED JUNE 22, 1915.
1,160,488.
Patented Nov. 16, 1915.
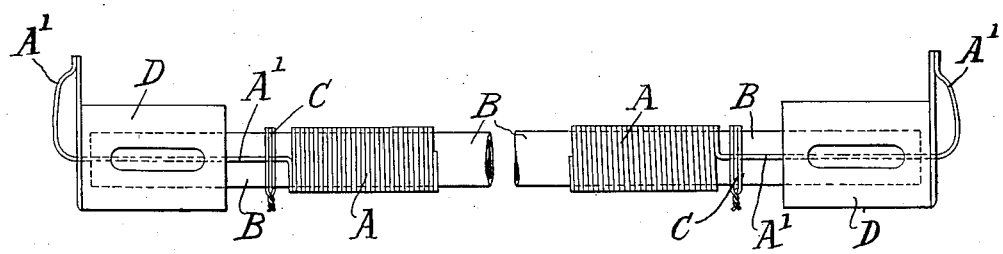
Inventor.
Charles Orme Bastian,
By Wilkinson, Giusta & MacKaye.
Attorneys.

UNITED STATES PATENT OFFICE.

CHARLES ORME BASTIAN, OF LONDON, ENGLAND.

ELECTRICAL RESISTANCE.

1,160,488.   Specification of Letters Patent.   Patented Nov. 16, 1915.

Application filed June 22, 1915. Serial No. 35,689.

*To all whom it may concern:*

Be it known that I, CHARLES ORME BASTIAN, electrical engineer, a subject of the King of Great Britain, residing at 32 The Avenue, Brondesbury Park, London, England, have invented certain new and useful Improvements in or Relating to Electrical Resistances, of which the following is a specification.

My present invention relates to electrical resistances of the kind known as electric resistance units and has for its object to provide electric resistance units of a very reliable character and of simple compact and economical construction, which may be used either as heating elements in electric radiators or electric heaters or which may be used as ordinary "resistances" or may be employed or used for any other purposes to which they are applicable.

In my U. S. patent specification No. 1,032,267 I have described spirally winding a resistance wire on a mandrel then removing it from the mandrel and placing it in a quartz tube and connecting the straight or straightened ends of the spiral wire to metal clips in which the quartz tube is supported.

An electric resistance unit according to the present invention comprises in combination: a mount or support; a wire preferably an oxidized wire, of small cross-sectional area as compared with that of the mount or support, wound as a single layer on said mount or support and with the contiguous convolutions of the winding in contact; and means for securing the wire at each end in such wise as to prevent dis-arrangement of the windings the convolutions of which are electrically insulated from one another. Therefore this closely wound spiral is not removed as heretofore from the mount or support on which same is wound; but, on the contrary, this closely wound spiral, according to this invention, is used as a resistance on and with the same mount or support on which it was originally wound and to which it is securely fastened as aforesaid. The continuous metallic resistance thus formed has, of course, a melting point lower than the melting point of said mount or support whereby said metallic resistance may be raised to a temperature above its glowing point without endangering and without detriment to its mount or support.

I will now describe my present invention with reference to the accompanying drawing which shows an electric resistance unit having the support or mount formed of quartz and suitable for use as the heating element in electric radiators or electric heaters.

In carrying out my present invention, I select an oxidizable or other suitable resistance wire or ribbon or the like (hereinafter referred to as the "wire") and then I closely wind such wire A (for example as illustrated in said drawing) so as to form a single layer and completely cover the whole or a part of a mount or support (which may be either solid or hollow) such as a tube B of quartz; or other suitable heat resisting material such as mica, slate or porcelain may be employed, for example a suitable length of tube, rod, sheet or other suitable shape or form of such heat resisting material. I arrange a length of unwound wire $A^1$ or more or less straight or straightened out portion of wire at each end of the spiral A thus formed over or mounted upon the quartz tube B or other support as aforesaid, and I secure the windings at each end in any suitable manner for example with binding wire C preferably of the same metal as the spiral winding A itself; and the straight or straightened end portions aforementioned are convenient for connecting the heating element formed as above described in an electric circuit; such connections being preferably removed as far as possible from the heat zone when it is to be used as a heating element in an electric heater for example the straight end-portions $A^1$ of the wire may be connected to tubular metal mounts or sockets D. Either before, during or after winding the wire A as aforesaid I provide same with an insulating coating advantageously an oxid coating for instance an oxid coating of its own metal whereby the contiguous convolutions are insulated from one another; and I may advantageously carry my present invention into practice by selecting a resistance wire of a suitable oxidizable metal such as nickel-chromium alloy.

Hollow quartz bodies or other form of quartz supports or mounts wound as above described may be used as electric muffle furnaces, or may be used as heating elements in electric radiators or electric heaters; while flat sheets of quartz closely wound with nickel-chromium alloy (*e. g.* such as that known by the trade name "Tabasco" alloy) are convenient for application in electric toasters, grills, ovens, etc.

What I claim is:—

An electric resistance unit for use at high temperatures comprising in combination a mount or support of heat resisting material, an oxidized wire, of small cross-sectional area as compared with that of the mount or support, wound as a single layer on said mount or support and with the contiguous convolutions of the winding in contact and means for securing the wire at each end to the said mount or support on which said wire has thus been wound in such wise as to prevent dis-arrangement of the winding, the convolutions of which are electrically insulated from one another substantially as and for the purposes hereinbefore described.

In witness whereof I have hereunto set my hand in presence of two witnesses.

C. ORME BASTIAN.

Witnesses:
 HENRY BIRKBECK,
 H. D. JAMESON.